United States Patent [19]

Zell et al.

[11] Patent Number: 5,085,493
[45] Date of Patent: Feb. 4, 1992

[54] METHOD OF SIMULTANEOUSLY SPLICING BY FUSION WELDING SEVERAL PAIRS OF OPTICAL WAVE GUIDES

[75] Inventors: Werner Zell, Cologne; Johann A. Becker, Overath; Ulrich Romahn, Castrop, all of Fed. Rep. of Germany

[73] Assignee: U.S. Philips Corporation, New York, N.Y.

[21] Appl. No.: 228,366

[22] Filed: Aug. 4, 1988

[30] Foreign Application Priority Data

Aug. 11, 1987 [DE] Fed. Rep. of Germany ....... 3726607

[51] Int. Cl.$^5$ .............................................. G02B 6/38
[52] U.S. Cl. .................................................... 385/96
[58] Field of Search ............. 219/123; 350/96.2, 96.21

[56] References Cited

U.S. PATENT DOCUMENTS 3,960,531 6/1976 Kohanzadeh et al. ............. 219/123
4,013,866 3/1977 Fox et al. ............................. 219/123
4,219,722 8/1980 Rudd et al. ......................... 219/123

Primary Examiner—William L. Sikes
Assistant Examiner—Robert E. Wise
Attorney, Agent, or Firm—Ernestine C. Bartlett; Leroy Eason

[57] ABSTRACT

A method of simultaneously splicing by fusion welding the splicing areas of each of successive adjacent pairs of optical waveguides, the welding being effected by generating an arc between a pair of welding electrodes having a width which overlaps all such splicing areas. A uniformly high quality splice of each pair is attained by establishing a magnetic field between the welding electrodes which interacts with the arc so as to cause it to reciprocate back and forth over the width of the welding electrodes a number of times determined by the number of pairs of waveguides to be spliced. The magnetic field and/or the welding current are controlled so that the average welding energy is the same at all splicing areas.

8 Claims, 1 Drawing Sheet

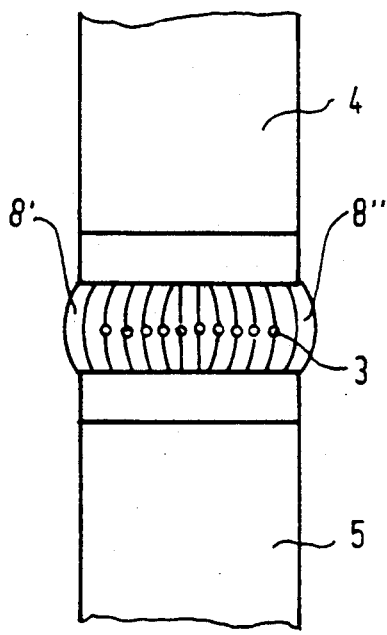
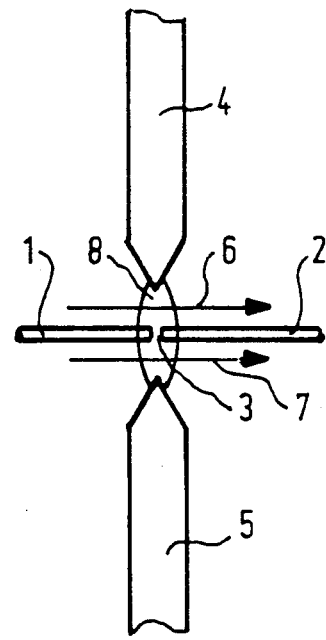
Fig. 1  Fig. 2
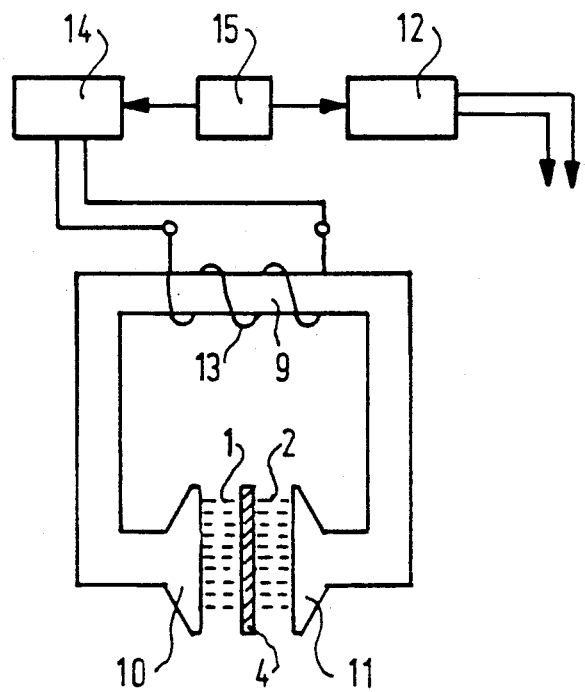
Fig. 3

METHOD OF SIMULTANEOUSLY SPLICING BY FUSION WELDING SEVERAL PAIRS OF OPTICAL WAVE GUIDES

BACKGROUND OF THE INVENTION

1. Field of the Invention

The invention relates to a method of simultaneously splicing by fusion welding several pairs of optical wave guides by means of an arc generated between two wide welding electrodes overlapping adjacent pairs of optical wave guides.

2. Description of the Prior Art

For efficiently splicing optical wave guides it is required to carry out the splicing operation simultaneously for several pairs of optical wave guides. This especially holds if, for example, 10 optical wave guides are already assembled into a flat cable.

When splicing several pairs of optical wave guides by fusion welding in an arc struck between stationary electrodes, the problem arises to arrange all abutment points on an isotherm of the arc see (EP-B-0069832). Moreover, the electrode gap must be considerably greater than would in fact be optimal for splicing especially monomode optical wave guides.

Alternatively, the arc may be directed perpendicularly to the plane of the pairs of optical wave guides, the successive pairs being successively spliced by displacement of the welding electrodes. According to EP-A-0196137, two pairs of optical wave guides can be spliced simultaneously. This known method requires complicated mechanical device, and the overall splicing time is comparatively long.

The arrangement of several pairs of electrodes see (DE-A-29 32 723) is practically not usable with a distance between the optical wave guides in the flat cable of, for example, only 250 μm because the heat dissipation through the necessarily extremely thin electrodes is not sufficient and the electrodes are burnt immediately. An electrical connection of the electrodes in parallel moreover would lead to the striking of the arc between only two electrodes.

A method of the kind described in the opening paragraph is known from Japanese Patent Application Kokai 53-73148. In this application, two pair of optical wave guides are simultaneously spliced by fusion welding between two edge-shaped welding electrodes extending over both splicing areas. However, a uniform distribution of the welding reliable manner.

SUMMARY OF THE INVENTION

The invention has for its object to carry out a method of the kind mentioned in the opening paragraph in such a manner that within a brief time a uniformly high quality splicing connection between each of the individual pairs of optical wave guides is obtained.

This object is achieved in that during the splicing operation a magnetic field is produced between the welding electrodes in such a manner that the arc reciprocally back and forth travels over the width of the welding electrodes.

The arc itself will not be no arc homogenous over the whole width of the electrodes between oblong electrode edges; the arc rather ignites and burns only over a limited range of such width. Due to the blowing effect of the magnetic field, however it is achieved according to the invention, that are arc supplies an average energy which is of the same intensity at all points along the width of the oblong electrodes as it moves to and fro, so that the splicing areas of the adjacent pairs of optical wave guides are all with the same welding energy and all have the same high splicing quality.

A particularly strong effect on the arc is attained if the magnetic field lines pass perpendicularly through the plane defined by the edges of the welding electrodes.

In order to obtain a uniformly high splicing quality of all pairs of optical wave guides, it has proved to be advantageous to use welding electrodes whose width exceeds that of the group of pairs of optical wave guides to be spliced. Thus, the inversion areas of the travelling arc, in which different energy densities with respect to the central area exist, are not used for splicing.

According to an advantageous embodiment, it is ensured that the magnetic field is permanent and the welding current is an alternating current.

A suitable alternative solution is characterized in that the welding current is a direct current and the direction of the magnetic field is reversed periodically.

An alternating magnetic field can be produced according to an advantageous embodiment between two soft magnetic pole pieces which are interconnected by a yoke onto which an excitation coil is wound.

To achieve that the splicing areas of the pairs of optical wave guides will be of a particularly uniform high quality, the variation in time of the excitation current in the excitation winding and/or of the welding current can be controlled so that the welding energy supplied to the individual pairs of optical wave guides is substantially equal.

Particularly satisfactory results were obtained if the duration of the period of reciprocating movement of the arc is small with respect to the duration of the entire splicing operation.

BRIEF DESCRIPTION OF THE DRAWINGS

The invention will now be described more fully with reference to the accompanying drawings, in which:

FIG. 1 is a longitudinal elevation of a welding apparatus suitable for practising the method according to the invention, FIG. 2 is a side elevation of the apparatus shown in FIG. 1, FIG. 3 shows the diagrammatic construction and the block circuit diagram of such a welding apparatus.

In the Figures, ten pairs of optical wave guides each consisting of optical wave guide 1 and 2 are indicated. The optical wave guides 1 and 2 are coaxially aligned pairwise and are to be spliced by fusion welding with their oppositely arranged end faces at the splicing areas 3. For this purpose, welding electrodes 4 and 5 are provided, which extend transversely across all the splicing areas 3 and whose width exceeds that of the group consisting of the ten pairs of optical wave guides.

By the magnetic field lines 6 and 7 extending parallel to the optical wave guides 1 and 2 through the arc region, a force is exerted on an arc 8 struck between the welding electrodes 4 and 5 across the splicing areas 3. Consequently, the arc 8 travels, for example, from the region 8' in FIG. 1 to the region 8". If the direction of the field lines 6 and 7 is reversed with respect to the direction of the welding current, the arc 8 travels from the region 8" back to the region 8'.

In order to ensure that the arc 8 rapidly travels to and fro over the splicing areas 3, in the case of, for example, a permanent magnetic direct field, an alternating current of suitable frequency can be provided for the welding current.

The same effect is also obtained if with a direct welding current a magnetic field formed by means of an excitation winding is an alternating field of corresponding frequency. The last-mentioned solution can be obtained by means of an arrangement shown diagrammatically in FIG. 3.

The magnetic field in FIG. 3 is formed between pole pieces 10 and 11 interconnected by a yoke 9 and arranged on opposite sides of the welding electrodes 4 and 5. Field lines are then generated parallel to the optical wave guides 1 and 2 indicated by broken lines.

It is sufficient if the pole pieces 10 and 11 extend only above or below the group of optical wave guides 1 and 2. However, it is particularly effective if pole pieces 10 and 11, respectively, each extend both below and above the optical wave guides so that, as seen in FIG. 2, magnetic field lines 6 and 7 act will upon the whole length of the arc 8.

The welding electrodes 4 and 5 are connected to a direct current source 12 so that a direct welding current flows. The excitation winding 13 is connected to an alternating current source 14 so that an alternating magnetic field is generated between the pole pieces 10 and 11. The period of this alternating field is of considerably shorter duration than the required splicing time, so that the simultaneous splicing operation of all the splicing areas 3 takes place with a corresponding number of reciprocating movements of the arc 8.

The uniform distribution of the welding energy over the individual splicing areas 3 is controlled by the control unit 15, by which especially the frequency and variation of the excitation current in the excitation winding 13 are suitably influenced. In addition, a controlled variation of the direct welding current can also be provided by superimposing a current which has the same frequency as the magnetic field.

It is also possible to provide an alternating magnetic field as well as an alternating welding current, in which event their frequencies of course have to be different. In this case, the frequencies of the welding current and of the excitation current will each be considerably higher than the frequency of the reciprocating movement of the arc 8.

What is claimed is:

1. A method of simultaneously splicing together each pair of a plurality of successive adjacent pairs of optical waveguides, the splicing being effected by fusion welding of adjoining splicing areas of the waveguides of each pair by supplying welding current to a pair of welding electrodes to generated an arc there-between, the electrodes respectively being on opposite sides of the splicing areas and each having a width which overlaps the splicing areas of all of the pairs of waveguides; such method comprising:

producing a magnetic field between the welding electrodes which interacts with the arc there-between so as to cause said arc to cyclically move forward and back in reciprocating motion across the width of the welding electrodes a number of times corresponding to the number of pairs of waveguides to be spliced, splicing of all of said pairs being completed during the last of said cycles of reciprocating motion of said arc; and controlling the magnetic field and/or the welding current supplied to said electrodes so that the average welding energy supplied to each of said pairs of splicing areas by said arc is the same for all of such pairs.

2. A method as claimed in claim 1, wherein each of the welding electrodes has an edge along the width thereof, and the magnetic field is in a direction perpendicular to the plane defined by the edges of both welding electrodes.

3. A method as claimed in claim 1, wherein the width of each of said welding electrodes extends beyond all of said pairs of optical wave guides.

4. A method as claimed in claim 1, wherein the magnetic field is permanent and an alternating welding current is supplied to the welding electrodes.

5. A method as claimed in claim 1, wherein a direct current is supplied to the welding electrodes and the magnetic field is periodically reversed in direction.

6. A method as claimed in claim 1, wherein the magnetic field is produced between soft magnetic pole pieces which are interconnected by a yoke having an excitation coil wound thereon, and an alternating current is supplied to said coil.

7. A method as claimed in claim 6, wherein the alternating current supplied to the excitation coil and/or the welding current supplied to the welding electrodes is controlled to supply equal average welding energy to the splicing areas of all of said pairs of optical wave guides.

8. A method as claimed in claim 1, wherein the period of reciprocating travel of said arc across the width of the welding electrodes is short with respect to the time to complete splicing of all said pairs of wave guides.

* * * * *